Feb. 21, 1967

F. V. ATKESON 3,305,340

METHOD AND APPARATUS FOR GENERATING
CURRENTS IN MOLTEN GLASS

Filed March 4, 1964

INVENTOR.
FLORIAN V. ATKESON
BY
Oscar L. Spencer
ATTORNEY

Feb. 21, 1967 — F. V. ATKESON — 3,305,340
METHOD AND APPARATUS FOR GENERATING
CURRENTS IN MOLTEN GLASS
Filed March 4, 1964 — 2 Sheets-Sheet 2
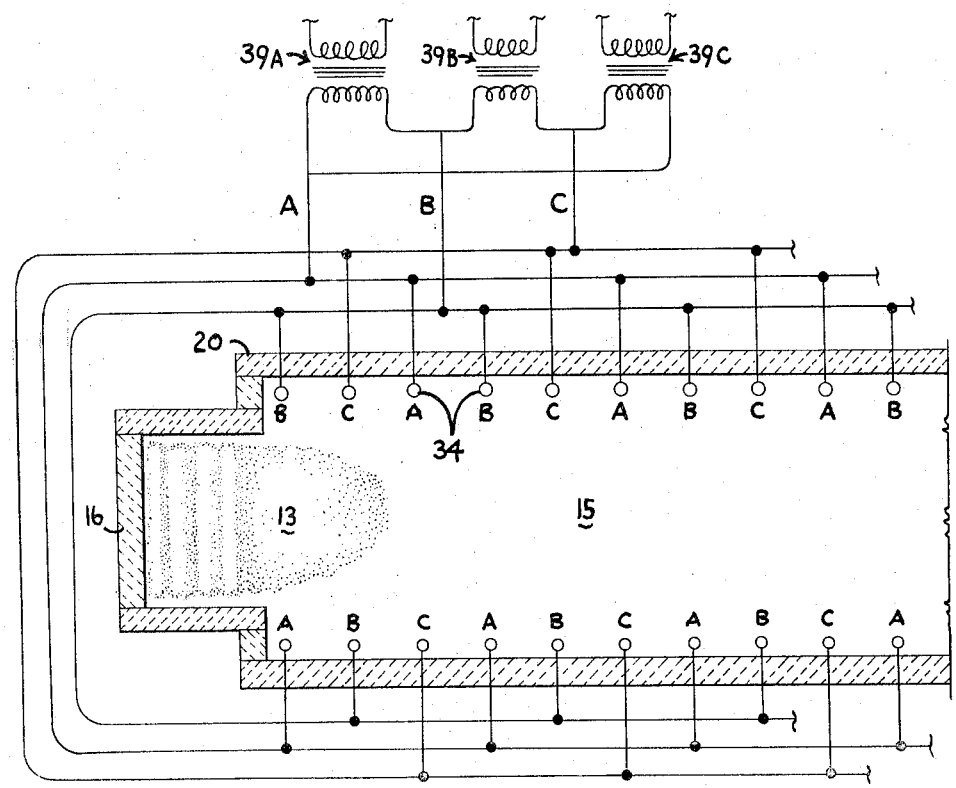
FIG. 2
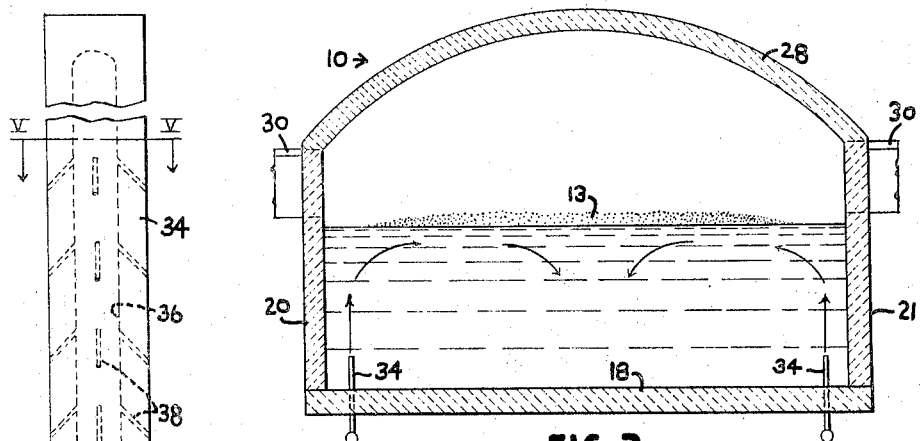
FIG. 4
FIG. 3
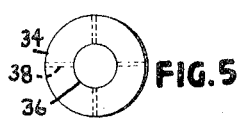
FIG. 5
INVENTOR.
FLORIAN V. ATKESON
BY Oscar L. Spencer
ATTORNEY

United States Patent Office 3,305,340
Patented Feb. 21, 1967

3,305,340
METHOD AND APPARATUS FOR GENERATING CURRENTS IN MOLTEN GLASS
Florian V. Atkeson, Springdale, Pa., assignor to Pittsburgh Plate Glass Company, Pittsburgh, Pa., a corporation of Pennsylvania
Filed Mar. 4, 1964, Ser. No. 349,398
4 Claims. (Cl. 65—134)

The present invention relates to the melting and refining of glass and particularly to the use of electrically generated localized heat along with the simultaneous introduction of a flow of gas into a bath of molten glass to produce and control currents of glass flow in a tank for continuously melting glass.

In conventional melting of glass utilizing cross-tank, regenerative firing, glass batch is introduced at one end of the tank and refined and conditioned molten glass is withdrawn at an opposite end of the tank in a continuous manner. Heat to melt and refine the glass is supplied from combustion flames produced by burning fuel gas or oil mixed with heated air. The flames are directed onto and above the molten bath from firing ports along the transversely extending side walls. Generally, cold batch, which is a good insulator, is fed in over molten glass and melting takes place from the top down. The under layer of molten glass merely supports the lighter batch and adds little to the melting action. As a result, the glass batch is melted more slowly than desired and a tank of sufficient length to accommodate this slower melting is required. A further characteristic of conventional melting techniques is the downward flow of glass adjacent the side walls of the tank occasioned by the lower temperature normally found along the walls. Such convective currents bring melting batch, foam and sodium sulfate floating on the surface of the bath into contact with the refractory walls of the tank. These constituents, when in contact with the walls, speed undesirable refractory attack. In addition, supersaturation of the molten glass with such highly reactive gases as $SO_3$, $SO_2$, $CO_2$ and $H_2O$ also plays a part in refractory breakdown.

In accordance with the present invention, the above-mentioned disadvantages of conventional melting techniques are overcome by introducing heat and bubbling gas within the bath of molten glass to establish and control desirable currents within the molten glass, to enhance the rate at which the glass batch is melted and to inhibit the normal surface flow of glass toward the side walls. In addition, the rate at which reactive gases are removed from the molten glass is enhanced, and homogenization of the molten glass is accomplished by increased mechanical movement of localized masses. As a result, batch melting times are diminished, glass-line refractory destruction is decreased and the refined glass withdrawn from the tank is of a more homogenous and, hence, higher quality.

Briefly, such improvement is accomplished by electrically generating heat within the molten glass at spaced locations adjacent the transversely extending side walls of the tank and simultaneously emitting a flow of gas into the molten bath at the same spaced locations. Localized heat may be conveniently generated by electrodes suitably placed within the tank. The general manner in which heat may be introduced to a molten bath of glass through electrodes connected to a suitable current source is well known. In the present invention, electrode bubblers (i.e., electrodes through which gas may be supplied to the molten bath) in the bottom of the tank adjacent the side walls facilitate the simultaneous introduction of heat and gas at the same spaced locations to enhance the melting and refining process. The introduction of gas results in a discharge of bubbles that rise upwardly, along with the locally heated glass, to the surface of the bath. The gas, in addition to contributing to the upward flow of glass and thereby controlling convective currents, also mechanically homogenizes the glass and removes occluded gases from the molten glass. The removal of such gas is enhanced by the introduction of inert gas through the bubbler-electrodes in the region of high energy exchange at the surfaces of the electrodes.

Other attendant advantages of this invention and the various embodiments thereof will be readily appreciated as the same become better understood by reference to the following detailed description when considered in connection with the accompanying drawings in which:

FIG. 2 is a partial, top, plan view of the tank of FIG. 1 showing the arrangement of the bubbler-electrodes and schematically illustrating a conventional wiring diagram for supplying the electrodes with electric current;

FIG. 3 is a section view of the tank of FIG. 1 taken along the line III—III of FIG. 1 looking in the direction of the arrows, and diagrammatically indicating by arrows the flow of molten glass currents established by the electrode-bubblers in accordance with the present invention;

Figure 1:
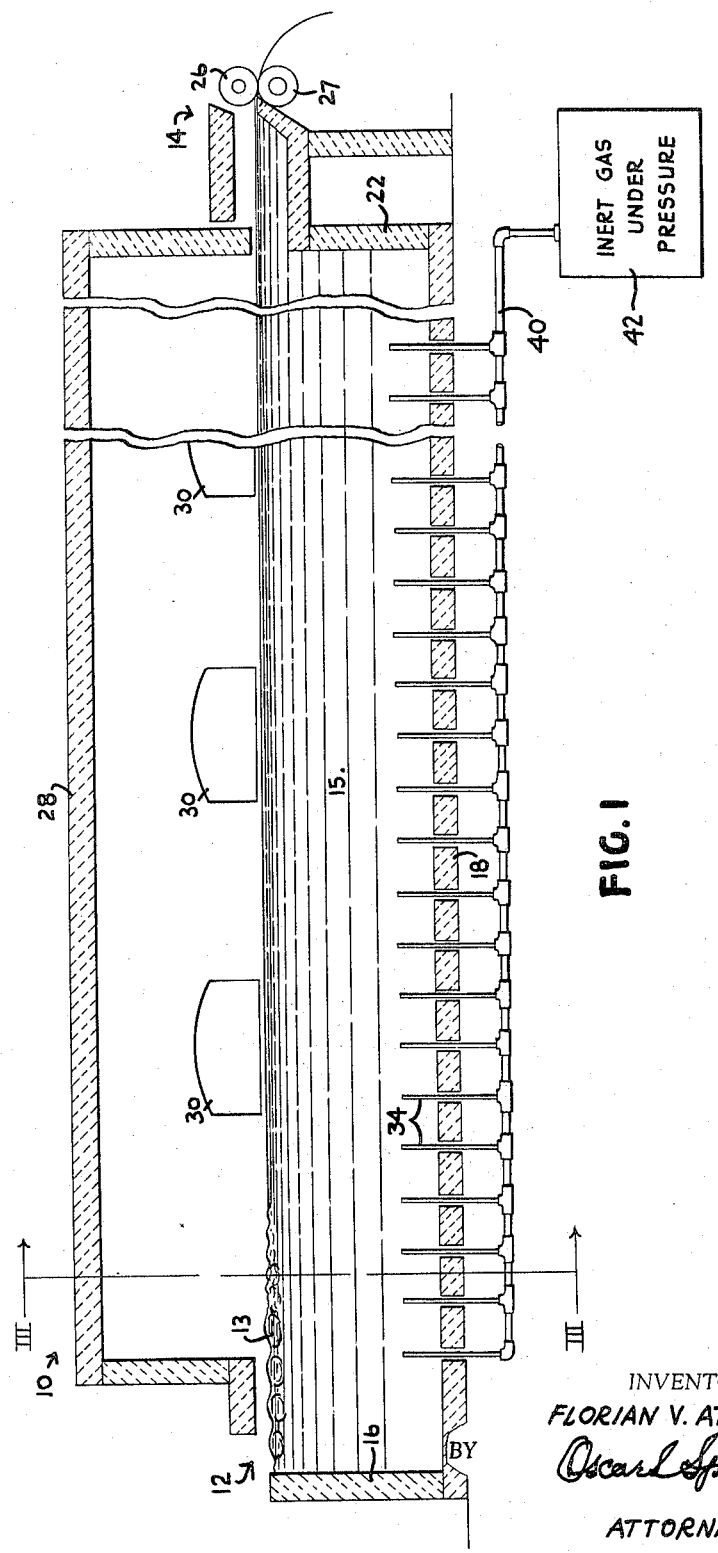
FIG. 1 is a diagrammatic section view taken along the longitudinal center line of a tank for continuously producing a ribbon of glass, and showing a row of bubbler-electrodes arranged in accordance with the present invention.

FIG. 4 is a partial view in elevation of an electrode-bubbler constructed in accordance with the present invention and illustrating, in dotted line, the internal bore and outlet passageways for introducing gas through the electrode-bubbler and into the molten bath of glass; and FIG. 5 is a section view of the bubbler-electrode taken along the line of V—V of FIG. 4 looking in the direction of the arrows.

Referring now to the drawings, there is shown in FIGS. 1 to 3 a refractory tank 10 of standard construction for continuously melting glass. The tank includes a batch feeding end or doghouse 12 where glass batch material 13 is introduced into the tank for melting, a glass withdrawing end 14 at the opposite end of the tank from the feeding end 12 where the melted glass is withdrawn and formed in any desired manner, and an intermediate portion between the batch feeding and glass withdrawing ends where the glass batch 13 is melted and melted glass 15 is thereafter refined and conditioned as it moves down the tank from the feeding end to the withdrawing end. Tank 10 includes a back wall 16, a bottom 18, spaced, laterally extending, upright side walls 20 and 21, a front wall 22 with adjoining spout 24 and conventional forming rolls 26 and 27, and a crown or top portion 28. Spaced firing ports 30 open through side walls 20 and 21 above the level of the molten glass bath 15. The entire tank is constructed in the conventional manner with standard refractory material and includes conventional means (not shown) to introduce batch to the feeding end 12 of the tank and conventional gas burners and regenerative checker works (not shown) associated with firing ports 30 to facilitate conventional flame melting and heating of the glass.

A plurality of electrode-bubblers 34 extend upwardly through the bottom 18 of the tank 10. Electrode-bubblers 34 are aligned in two rows, one row adjacent one laterally extending side wall 20 and one row adjacent the opposite laterally extending side wall 21, the electrode-bubblers being spaced from each other along the length of the tank 10. The electrode-bubblers 34 extend vertically upward within the molten bath of glass 15 and are located beneath the surface of the molten glass, preferably in the lower portion only of the bath.

Constructional details of the electrode-bubblers 34 are shown in FIGS. 4 and 5. Each electrode-bubbler 34 is a cylindrical rod electrode having a central bore 36 extending along the longitudinal axis, so as to form a hollow portion. The central bore terminates short of one end, which end will be uppermost when the electrode-bubbler is mounted in a tank in the manner shown in FIGS. 1 to 3. A plurality of radially disposed bores or orifices 38, smaller in diameter than bore 36, communicate through the wall of electrode-bubbler 34 between the central bore 36 and the exterior of the electrode-bubbler. Preferably, the central bore 36 will be sufficiently large to supply a flow of gas under pressure to all radially extending bores 38 at a substantially equal rate. Radial bores 38 are preferably small enough, e.g., ⅛ inch in diameter or less, to prevent molten glass from entering the bores even in the absence of positive pressure in central bore 36, and large enough, i.e., at least 1/32 inch in diameter, to produce bubbles of adequate size under reasonable gas supply pressure. Preferably the radial bores 38 are distributed uniformly about the peripheral surface of cylindrical electrode-bubbler 34. The radial bores are located only throughout the upper two-thirds or three-fourths of that portion of the electrode-bubbler that extends into the molten bath to prevent turbulence at the base of the electrode-bubbler adjacent the bottom of the tank, thereby minimizing refractory erosion. The angle at which the radial bores 38 extend through the wall of the electrode-bubbler is not critical. When electrode-bubblers 34 are used with an inert gas, such as nitrogen, the electrode-bubblers may advantageously be made of molybdenum.

Electrode-bubblers 34 extend through openings in the bottom 18 of the tank 10 and are mounted therein and connected to a power source in the conventional manner well known in the art. The mounting means may include a water cooled jacket and other protective means (not shown) to prevent oxidation. As diagrammatically shown in FIG. 2, the electrode-bubblers 34 are energized utilizing three-phase, alternating current through three single-phase transformers 39A, 39B and 39C in a manner known in the art. The transformer output current is suitably regulated, as by saturable reactors in the known manner. With this arrangement, every third electrode, designated with a like letter A, B, or C, along each side of the tank 10 is energized simultaneously, and each group A, B and C is energized seriatim through transformers 39A, 39B and 39C by the three-phase alternating current. The electrode-bubblers energized on one side are located so as not to be directly opposite the energized electrode-bubblers on the other side, thereby providing good heat distribution. Other equally suitable arrangements may be used to supply current to the electrode-bubblers.

The central bores 36 of each electrode-bubbler 34 are connected in a conventional manner via conduit 40 to a common source 42 of inert gas, such as nitrogen, under pressure. The source of inert gas under pressure is adequate to supply gas at a constant rate to each bubbler-electrode 34 to continuously bubble inert gas from each electrode-bubbler 34 in a uniform manner along each laterally extending side wall of the tank simultaneously with the generation of heat by electric energy from the power source.

In operation, by way of example, glass batch materials 13 for producing typical soda-lime-silica plate glass are introduced to tank 10 through feeding end or doghouse 12 above a bath 15 of molten soda-lime-silica glass already within tank 10. As the batch flows from the feeding end 12 toward the withdrawing end 14, it is melted, refined and conditioned and then withdrawn at forming end 14 and formed into a flat ribbon by forming rolls 26 and 27. Typically, tank 10 is 30 feet wide, 90 feet long and 48 inches deep, contains 800 tons of glass and produces a continuous ribbon of glass 136 inches wide of a thickness between ⅛ and ¼ inch.

Heat is applied within tank 10 by burning a mixture of gas and preheated air and directing the flame and products of combustion from the firing ports 30 across the surface of the molten bath 32 in a conventional manner. Heat is also added to the molten bath 32 from beneath the surface thereof by electrode-bubblers 34. A row of vertically disposed electrode-bubblers extends upwardly through the bottom 18 of tank 10 and extends along each side wall 20 and 21. Each row is spaced approximately 6 inches from the adjacent side wall. Each electrode-bubbler is spaced approximately 30 inches from the next adjacent electrode-bubbler and each extends upwardly into the bath a distance of approximately 18 inches. The top 12 inches of each bubbler-electrode contains orifices for emitting inert gas under pressure. Electrodes three inches in diameter with an internal bore of 2 inches in diameter are suitable. Radial bores 1/16 inch in diameter through the electrode wall emit inert gas at a satisfactory rate while essentially preventing the flow of molten glass into the internal bore of the electrode even in the absence of gas pressure. Nitrogen at ambient temperatures, supplied at a flow rate of 4 to 8 cubic feet per hour and at a pressure of 2 to 5 pounds per square inch gauge, is suitable for emitting bubbles of adequate size and at a sufficient rate to establishing the desired beneficial effects; i.e., upward movement and homogenization of the glass and removal of occluded gas.

Electrical energy is supplied by applying alternating current through three single phase transformers. A power loading at each electrode of 30–50 volts and 200 amperes provides sufficient heat to cause upward flow of molten glass about each vertically disposed electrode adjacent the laterally extending side walls of the tank.

With this arrangement, the molten glass bath 15 adjacent the bottom 18 of tank 10 will reach a temperature of approximately 2200 degrees Fahrenheit with a temperature above the glass of 2600 degrees Fahrenheit. At the same time, an upward current of rising glass and bubbles is produced along each laterally extending side wall of the tank, which current then flows toward the center of the tank at the surface of the molten bath, as indicated schematically by the arrows of FIG. 3. Beneath the batch, this current of glass will be 200 to 300 degrees Fahrenheit hotter than would be the glass beneath the batch in the absence of the electrode-bubblers.

It will be readily apparent to those skilled in the art that variations in the disclosed apparatus and exemplary mode of operation may be made and that the inventive concept may be utilized in other embodiments than that specifically disclosed herein. For example, other continuous glass melting tanks, such as fiber glass tanks, may readily use the electrode-bubbler arrangement in the same manner as described above in connection with a plate glass manufacturing tank. Of course, the size and number of electrodes used will vary, depending upon the size of the glass melting tank, but the relative position and location of the electrodes must remain substantially the same, i.e., along the laterally extending side walls, to establish the desired flow.

The rate at which bubbles and heat are introduced into the tank through the bubbler-electrodes will vary, depending upon such conditions as tank size, depth of glass, production rate, etc. For example, the current density may vary between ½ to 10 amperes per square inch of electrode surface area and the gas may be supplied at a rate between 1 and 10 cubic feet per hour under pressure varying between 2 and 20 pounds per square inch gauge. Thus, it is contemplated that electrical energy and gas will be supplied at rates sufficient to establish upwardly moving currents of molten glass adjacent to the laterally extending side walls, but without causing excessive frothing of the glass. Furthermore, the introduction of gas and heat through a common electrode-bubbler is desirable because of the enhanced effect caused by the cooperation between the gas bubbles and the heated glass surrounding the electrodes, both from the standpoint of the thermal and physical effects upon the molten glass in controlling the convective currents and homogenizing the glass, as well as in the enhanced removal of undesirable occluded gas within the molten glass.

It should be evident from the above that, while in the foregoing disclosure certain preferred embodiments of the invention have been disclosed, numerous modifications or alterations may be made therein without departing from the spirit and the scope of the invention as set forth in the appended claims.

I claim:

1. A method of generating currents of moving glass in a tank of molten glass having lateral sides and a continuous flow of glass from one end where batch is introduced to an opposite end where molten glass is withdrawn, the steps comprising electrically heating the molten glass beneath the surface of the molten glass and at spaced locations along and closely adjacent the lateral sides of said tank, and simultaneously introducing inert gas into the molten glass at the same spaced locations where the heat is generated so as to emit bubbles of inert gas into the glass at said spaced locations, whereby currents of glass are caused to move upwardly adjacent the lateral sides of the tank and thence centrally of the tank adjacent the surface of the molten bath.

2. In a method of melting and fining glass by a continuous process in a tank having lateral side walls, one end portion where glass batch material is introduced, an opposite end portion where molten glass is removed, and an intermediate portion in which glass is melted and refined, the steps comprising electrically heating the molten glass beneath the surface thereof and within the bath in said intermediate portion of the tank at spaced locations closely adjacent the side walls of the tank, and simultaneously emitting bubbles of inert gas at said same spaced locations so as to create an upward flow of molten glass adjacent the side walls of said intermediate portion of the tank.

3. Apparatus for continuously melting and fining glass including, in combination, a refractory tank having two lateral sides, one end where glass batch is introduced, an opposite end where molten glass is removed and an intermediate portion where the batch is melted to form glass and the glass is refined to improve quality; and two rows of spaced, upright, electrode-bubblers within the tank and below the surface of the molten glass, one row extending along and closely adjacent a portion of each lateral side of the tank, each electrode-bubbler being comprised of a hollow electrode rod, means to supply gas under pressure to the hollow portion of said electrodes, and means to simultaneously supply current to said electrodes.

4. Apparatus for continuously melting and fining glass including, in combination, a refractory tank having two lateral sides, one end where glass batch is introduced, an opposite end where molten glass is removed and an intermediate portion where the batch is melted to form glass and the glass is refined to improve quality; and a row of spaced, upright, eelctrode-bubblers extending along and located closely adjacent a portion of each lateral side of the tank beneath the surface of the molten glass, each electrode-bubbler being comprised of a hollow electrode rod having an inlet opening and a plurality of laterally disposed passageways at least $\frac{1}{32}$ inch in diameter communicating with a central bore for emitting gas, means to supply gas under pressure to the central bore of each said electrode-bubbler, and means to simultaneously supply current to said electrodes.

References Cited by the Examiner

UNITED STATES PATENTS

| 2,490,339 | 12/1949 | De Voe | 65—135 |
| 2,521,334 | 9/1950 | Boerstra | 259—95 |
| 2,641,454 | 6/1953 | Labino | 65—134 |
| 3,015,190 | 1/1962 | Arbeit | 65—134 |
| 3,108,149 | 10/1963 | Carney et al. | 65—134 |
| 3,219,427 | 11/1965 | Hymowitz | 65—134 |

S. LEON BASHORE, *Primary Examiner.*

DONALL H. SYLVESTER, G. R. MYERS,
*Assistant Examiners.*